US012810570B2

(12) United States Patent
Lee et al.

(10) Patent No.: US 12,810,570 B2
(45) Date of Patent: Nov. 24, 2026

(54) IMAGE STITCHING METHOD USING IMAGE MASKING

(71) Applicant: ELECTRONICS AND TELECOMMUNICATIONS RESEARCH INSTITUTE, Daejeon (KR)

(72) Inventors: Hyun Yong Lee, Daejeon (KR); Nack Woo Kim, Daejeon (KR); Byung-Tak Lee, Daejeon (KR); Jungi Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 595 days.

(21) Appl. No.: 18/339,444

(22) Filed: Jun. 22, 2023

(65) Prior Publication Data

US 2024/0062501 A1 Feb. 22, 2024

(30) Foreign Application Priority Data

Aug. 17, 2022 (KR) ........................ 10-2022-0102719
Mar. 20, 2023 (KR) ........................ 10-2023-0035949

(51) Int. Cl.
*G06V 10/10* (2022.01)
*G06V 10/44* (2022.01)
*G06V 10/82* (2022.01)

(52) U.S. Cl.
CPC .............. *G06V 10/16* (2022.01); *G06V 10/44* (2022.01); *G06V 10/82* (2022.01)

(58) Field of Classification Search
CPC ..... G06T 3/4038; G06T 3/4046; G06V 10/82; G06V 10/16
See application file for complete search history.

(56) References Cited

U.S. PATENT DOCUMENTS 6,118,595 A * 9/2000 Miller .................... G03B 37/04 359/728
9,361,721 B2 6/2016 Muninder et al.
(Continued)

FOREIGN PATENT DOCUMENTS

CN 109961444 A * 7/2019 .............. G06T 7/11
KR 10-2019-0014771 A 2/2019
KR 10-2386221 B1 4/2022

OTHER PUBLICATIONS

Zhang et al, GPS-assisted Aerial Image Stitching Based on Optimization Algorithm, Proceedings of the 38th Chinese Control Conference, Guangzhou, China, 2019, pp. 3485-3490, doi: 10.23919/ChiCC.2019.8866089, furnished vis IDS.*
(Continued)

*Primary Examiner* — Guillermo M Rivera-Martinez

(57) ABSTRACT

Provided are a method and apparatus capable of improving the feature extraction required for image stitching, the computational efficiency of homography calculation based on the feature extraction, and the performance of image stitching. The image stitching method according to the present invention includes: based on two images and additional information as needed, calculating an overlapping area in which two images overlap each other; masking an area in which the two images do not overlap each other based on information about the calculated overlapping area to provide masked images; extracting significant features to be used for image stitching from the masked images; calculating a homography to be used for image transformation based on the extracted features; and transforming and stitching the images based on the calculated homography.

19 Claims, 9 Drawing Sheets

(56) References Cited

U.S. PATENT DOCUMENTS

| | | | | |
|---|---|---|---|---|
| 9,781,356 | B1 * | 10/2017 | Banta | H04N 23/698 |
| 10,991,073 | B2 | 4/2021 | Cho et al. | |
| 11,182,886 | B2 | 11/2021 | Cho et al. | |
| 2012/0050525 | A1 * | 3/2012 | Rinner | G06T 7/33 382/103 |
| 2012/0237137 | A1 * | 9/2012 | Chen | G06T 5/50 382/284 |
| 2013/0169811 | A1 * | 7/2013 | Smitherman | G01C 11/02 348/148 |
| 2014/0248950 | A1 * | 9/2014 | Tosas Bautista | G06F 3/01 463/31 |
| 2015/0029306 | A1 * | 1/2015 | Cho | H04N 23/6811 348/38 |
| 2016/0292821 | A1 * | 10/2016 | Cho | G06T 7/38 |
| 2017/0269585 | A1 * | 9/2017 | Jaiswal | H04L 67/10 |
| 2019/0325580 | A1 * | 10/2019 | Lukac | G06T 3/4038 |
| 2019/0332625 | A1 * | 10/2019 | Lee | G06V 20/20 |
| 2020/0226716 | A1 * | 7/2020 | Um | H04N 23/698 |
| 2020/0324898 | A1 * | 10/2020 | Youmans | G01C 21/005 |
| 2021/0295467 | A1 * | 9/2021 | Rao | G06T 3/4038 |
| 2022/0139073 | A1 * | 5/2022 | Kim | G06V 10/82 382/155 |
| 2022/0180475 | A1 * | 6/2022 | Miyashita | G06V 20/48 |

OTHER PUBLICATIONS

Pham et al., "Fast and Efficient Method for Large-Scale Aerial Image Stitching," in IEEE Access, vol. 9, pp. 127852-127865, 2021, doi: 10.1109/ACCESS.2021.3111203.*

Ting Zhang et al., "GPS-assisted Aerial Image Stitching Based on optimization Algorithm", Proceedings of the 38th Chinese Control Conference, Jul. 27, 2019, Guangzhou, China.

Nam Thanh Pham et al., "Fast and Efficient Method for Large-Scale Aerial Image Stitching," IEEE Access, Sep. 9, 2021, vol. 9.

Ying Chen et al., "Guide Local Feature Matching by Overlap Estimation," AAAI Conference on Artificial Intelligence, Feb. 18, 2022.

* cited by examiner

IMAGE STITCHING METHOD USING IMAGE MASKING

CROSS-REFERENCE TO RELATED APPLICATIONS

This application claims priority to and the benefit of Korean Patent Applications No. 10-2022-0102719 filed on Aug. 17, 2022 and No. 10-2023-0035949 filed on Mar. 20, 2023, the disclosures of which are incorporated herein by reference in their entirety.

BACKGROUND

1. Field of the Invention

The present invention relates to image stitching in which two or more images are stitched to generate a single image.

2. Discussion of Related Art

Image stitching is a technology of stitching two or more images that include overlapping areas therebetween to generate a single image. Image stitching is used in various forms in various fields, such as medical care, facility inspection, and military.

The general procedure of image stitching is as follows.

Features are extracted from stitching target images. For the feature extraction, algorithms, such as a scale invariant feature transform (SIFT) and speeded up robust features (SURF), may be used, or artificial neural networks, such as a convolutional neural network (CNN), may be used.

Among the extracted features, features found in common between the stitching target images are matched to each other. The common features may be matched by calculating the distances between the features, and an artificial neural network, such as CNN, may be used in this case as well.

Based on the matched features, a homography to be used to transform the images to be stitched such that the images are located to be coplanar is calculated. The homography may be calculated through a random sample consensus (RANSAC) algorithm or a direct linear transformation (DLT) algorithm.

The images are transformed through the calculated homography such that the images are prepared to be suitable for stitching.

The images prepared by transformation are stitched based on the matched features to generate a single image.

Conventional image stitching techniques have attempted to improve accuracy, computational speed, or computational efficiency of image stitching by utilizing various types of additional information. One of the types of additional information used in this case is Global Positioning System (GPS) information about a location in which an image is captured. According to the conventional technology, image stitching is performed, and a GPS location and the like at the time of the image capture is referenced as one state variable and used to correct the stitched image. According to another conventional technology, as with features found in an image captured at the current point in time, an area in which the features may appear in an image to be captured next is predicted based on GPS information, so that a range to be considered when extracting features from the image to be captured next is limited to improve the calculation efficiency.

SUMMARY OF THE INVENTION

It is an object of the present invention is to propose a method capable of improving the feature extraction required for image stitching, the computational efficiency of homography calculation based on feature extraction, and the performance of image stitching.

To achieve the above object, images used for feature extraction and homography calculation are subject to masking based on GPS information and the like so that unrequired information is deleted.

In detail, according to an aspect of the present invention, there is provided an image stitching method and image stitching apparatus having computational operations for image stitching processed by a processor included in a computer, the computational operations including: calculating an overlapping area with respect to a plurality of original images; masking an area in which the plurality of original images do not overlap each other in the plurality of original images using the calculated overlapping area to provide masked images; extracting features usable for stitching of the original images from the masked images; calculating a homography for transformation of the original images using the extracted features; and transforming the original images using the calculated homography and stitching the transformed original images to output a stitched image.

The calculating of the overlapping area may include calculating presence or absence of an overlap in units of pixels or an overlap in units of super-pixels with respect to each of the original images.

The calculating of the overlapping area may include, in the case of no information about an error in the calculating of the overlapping area with respect to the plurality of original images, outputting a result of calculating the overlapping area without change, or including or removing an additional marginal area in or from a first calculated overlapping area to finally determine the overlapping area.

The calculating of the overlapping area may include, in response to receiving information about an error in the calculating of the overlapping area with respect to the plurality of original images, correcting the overlapping area considering the error, or including or removing the error and an additional marginal area in or from a first calculated overlapping area to finally determine the overlapping area.

The masking may include masking an area other than the overlapping area calculated with respect to the original image, or masking an area other than the overlapping area calculated with respect to the original image and a surrounding area of the overlapping area.

In addition, the calculating of the overlapping area may include calculating an image overlapping area by using a tool for calculating an overlapping area using Global Positioning System (GPS) information of the original image, a tool for extracting features from the original images and calculating an area in which features found in common between the original images are distributed as an overlapping area, a tool for calculating an overlapping area using an artificial neural network, or a plurality of the calculation tools.

When the image overlapping area is calculated using the plurality of calculation tools, an area in which overlapping areas calculated by the plurality of calculation tools overlap each other may be determined as a final overlapping area, or an area including the overlapping areas calculated by the plurality of calculation tools may be determined as a final overlapping area.

The configuration and operation of the present invention will become more apparent through specific embodiments described with reference to the drawings.

DETAILED DESCRIPTION OF EXEMPLARY EMBODIMENTS

Hereinafter, exemplary embodiments of the present disclosure will be described in detail with reference to the accompanying drawings. Terms used herein are used for describing the embodiments and are not intended to limit the scope and spirit of the present invention. In the specification, the singular forms "a" and "an" also include the plural forms unless the context clearly dictates otherwise. The terms "comprises," "comprising," "includes," and/or "including," when used herein, specify the presence of stated steps, operations and/or elements thereof and do not preclude the presence or addition of one or more other steps, operations, and/or elements thereof.

Basic Structure

Figure 1:
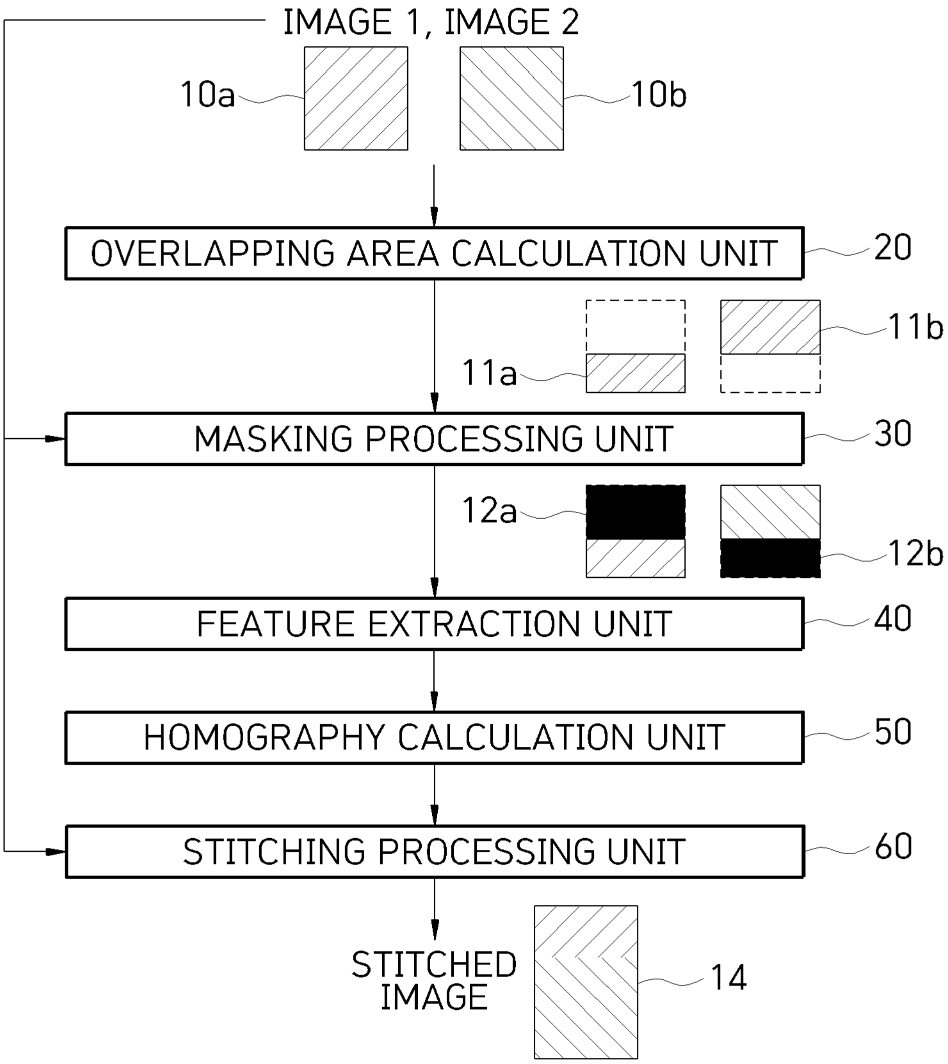
FIG. 1 is a block diagram of an image stitching method and apparatus using image masking according to the present invention.

FIG. 1 is a process flowchart illustrating an embodiment of an image stitching method using image masking according to the present invention. In the process flow chart of FIG. 1, the subjects of operations may be an overlapping area calculation unit 20, a masking processing unit 30, a feature extraction unit 40, a homography calculation unit 50, and a stitching processing unit 60 that may be implemented as computer-based hardware and/or software.

For the sake of convenience of technical understanding, the following description of the embodiment considers a case in which images to be stitched are two images 10*a* and 10*b*, but the method proposed by the present invention may be equally applied to stitching two or more images.

The first operation of the image stitching method is an overlapping area calculation operation in which an overlapping area calculation tool or an overlapping area calculation unit 20 calculates overlapping areas 11*a* and 11*b* of two images with respect to the two images 10*a* and 10*b* (if necessary, by using additional information). The output of this operation may be the presence or absence of an overlap in units of pixels with respect to each image. Alternatively, the output of this operation may be the presence or absence of an overlap in units of super-pixels (a group of pixels having the same characteristics) with respect to each image.

In the second operation, the masking processing unit 30 masks a pixel area in which the two images 10*a* and 10*b* do not overlap each other, based on information about the calculated overlapping area, to prevent the corresponding area from being utilized in the subsequent operations of a feature extraction and a homography calculation. The output of this operation is masked images, i.e., images with masked portions 12*a* and 12*b*.

In the third operation, the feature extraction unit 40 extracts significant features to be used for image stitching from the masked images. The output of this operation is the extracted features.

The fourth operation is an operation of calculating a homography to be used for image transformation through the homography calculation unit 50, based on the extracted features. The output of this operation is the calculated homography.

Finally, the fifth operation is an operation of transforming and stitching the images, based on the calculated homography by the stitching processing unit 60. In this operation, the original images 10*a* and 10*b* are used instead of the masked images. The output of this operation is a single stitched image 14.

In summary, the overlapping area calculation unit 20 calculates the image overlapping areas 11*a* and 11*b*, the masking processing unit 30 performs mask-processing on the images based on the calculated image overlapping areas 11*a* and 11*b* to provide the masked images with masked portions 12*a* and 12*b*, the feature extraction unit 40 and the homography calculation unit 50 respectively perform feature extraction and homography calculation based on the masked images, and the stitching processing unit 60 stitches the original images 10*a* and 10*b* according to the calculated homography to generate the stitched image 14.

In other words, the core of the present invention compared to the existing techniques is to perform feature extraction and homography calculation based on masked images through image overlapping area calculation, and then proceed with image stitching by applying the derived homography to the original images.

Next, each component briefly described with reference to FIG. 1 will be described in more detail.

Overlapping Area Calculation Unit 20

The overlapping area calculation tool or the overlapping area calculation unit 20 is provided to calculate an overlapping area of the images 10*a* and 10*b* that are subjected to stitching based on the original images (using additional information, as needed).

The method of calculating the image overlapping area may be utilized in various forms. For example, when there is no error information in the calculating of the image overlapping area, the result of calculating the overlapping area may be used as it is. In addition, when there is no error information in the calculating of the image overlapping area, an additional margin area may be added to or removed from the calculated overlapping area to finally determine the overlapping area. For another example, when error information in the calculating of the image overlapping area is provided, the overlapping area may be corrected in consideration of the calculation error. When error information in the calculating of the image overlapping area is provided, the calculation error and an additional margin area may be added to or removed from the calculated overlapping area to finally determine the overlapping area. For reference, the traditional formula-based algorithms are deterministic models, and even when applied multiple times to the same image, produce the same result and have no error, while some artificial neural networks composed of probabilistic models may produce different results with each execution. In this case, the average of the results of the multiple executions may be used as an overlapping area, and the standard deviation may be used as an error.

Masking Processing Unit 30

The masking processing unit 30 involves an operation of removing information unrequired in subsequent operations based on the overlapping area information derived through the overlapping area calculation unit 20 described above.

The masking process may enable various forms of change to prevent significant features from being extracted by a method used in feature extraction by the feature extraction unit 40.

Figure 2A:
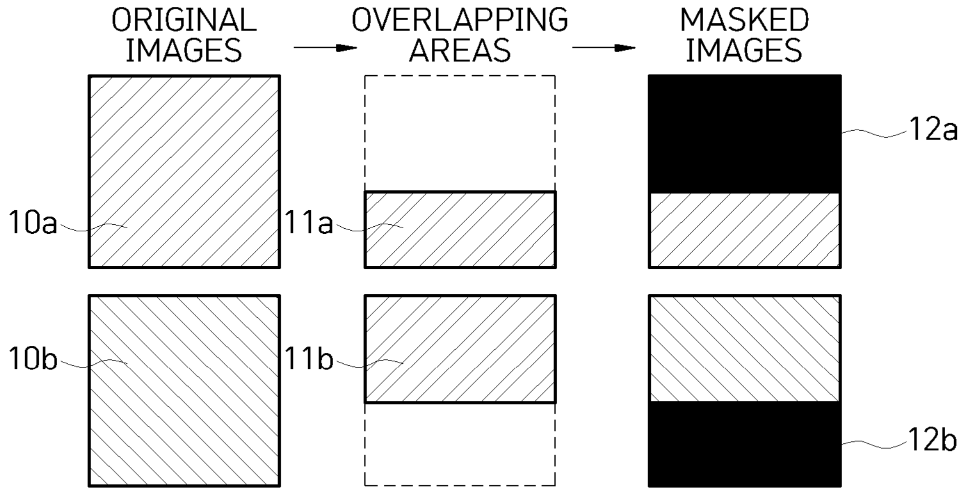
FIG. 2A is an exemplary view illustrating one type of image masking.

For example, as shown in FIG. 2A, an image may be subjected to masking with the black that has no information. FIG. 2A illustrates one type of image masking performed by the masking processing unit 30, which shows a method of masking some portions of the original images 10*a* and 10*b*, which are not the calculated overlapping areas 11*a* and 11*b*, as masked forms 12*a* and 12*b* having no information.

Figure 2B:
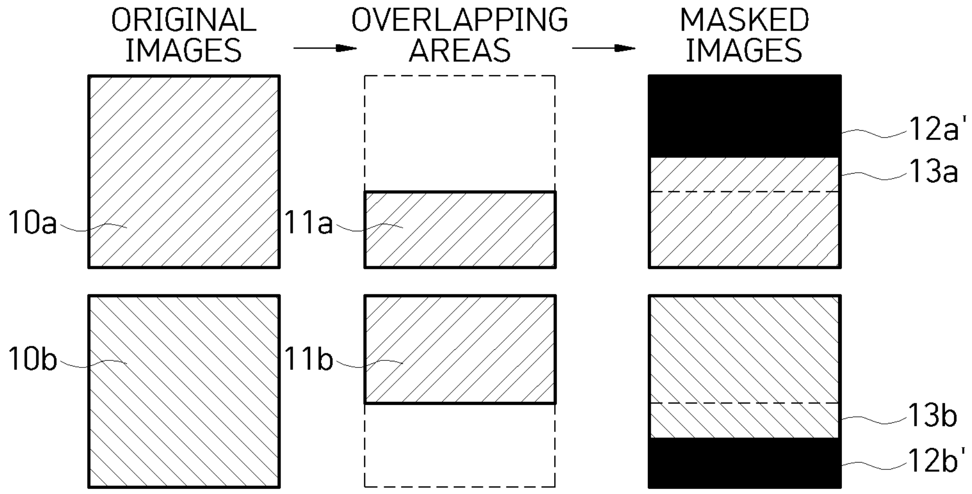
FIG. 2B is an exemplary view illustrating another type of image masking.

FIG. 2B illustrates another type of image masking performed by the masking processing unit 30. Portions of the original images 10*a* and 10*b* that are not the calculated overlapping areas 11*a* and 11*b* but surround some areas 13*a* and 13*b* of the overlapping areas 11*a* and 11*b*, may be treated as masked forms 12*a*' and 12*b*' having no information.

In FIGS. 2A and 2B, the overlapping areas 11*a* and 11*b* are illustrated as simple quadrangles for the sake of convenience of understanding, but the overlapping areas 11*a* and 11*b* may have various shapes depending on the methods of detecting an overlapping area.

Feature Extraction Unit 40

In performing image stitching, a criterion for stitching images is needed, and for this, features extracted from images are used. The feature extraction unit 40 extracts significant features from images to be stitched. Image extraction may be largely divided into two types.

The first type of image extraction is the use of a well-known feature extraction algorithm. For example, algorithms, such as a scale invariant feature transform (SIFT), speeded up robust features (SURF), and an oriented and rotated BRIEF (ORB) may be employed. The second one is the use of artificial neural networks, such as a convolutional neural network (CNN). The inventor do not propose a new method of image feature extraction. The core of the present invention, distinguished from the conventional method, is to perform feature extraction on masked images using known methods.

Homography Calculation Unit 50

A homography is a matrix used in image stitching to transform images captured in different environments (e.g., at different angles, etc.) as if the images were located to be coplanar such that the images are smoothly stitched.

The homography calculation unit 50 performs homography calculation for image stitching. The homography calculation is performed based on the features extracted in the feature extraction operation described above. In particular, the homography calculation is based on features found in common between images to be stitched.

The homography calculation may be largely divided into two types. As a first type of homography calculation, a well-known homography calculation algorithm may be used. For example, algorithms such as a random sample consensus (RANNSAC) and a direct linear transformation (DLT) may be used. In this case, algorithms may be used together with feature extraction algorithms, such as an SIFT, SURF, an ORB, etc. described above.

In the second type of homography calculation, an artificial neural network may be used. In this case, the artificial neural network may be used together with feature extraction methods, such as a CNN described above. In this case, the input of the artificial neural network may be an image to be stitched, and the output of the artificial neural network may be homography data.

The present invention does not propose a new method of homography calculation. The core of the present invention, distinguished from the conventional methods, is to calculate a homography based on a masked image and features extracted from the masked image.

Stitching Processing Unit 60

The stitching processing unit 60 derives a stitched image using the calculated homography and the original images 10*a* and 10*b* as an input. Based on the homography calculated according to the above method, images to be stitched may be transformed. The image transformation is required because the same subject included in images to be stitched may be located on different planes as the images are captured from different angles or the like. Therefore, there is a need to perform projective transformation such that images to be stitched are represented to be coplanar. The transformed images may be stitched based on common features acquired according to the feature extraction method described above. The operation is performed based on the original images 10*a* and 10*b* rather than the masked images.

Figure 3A:
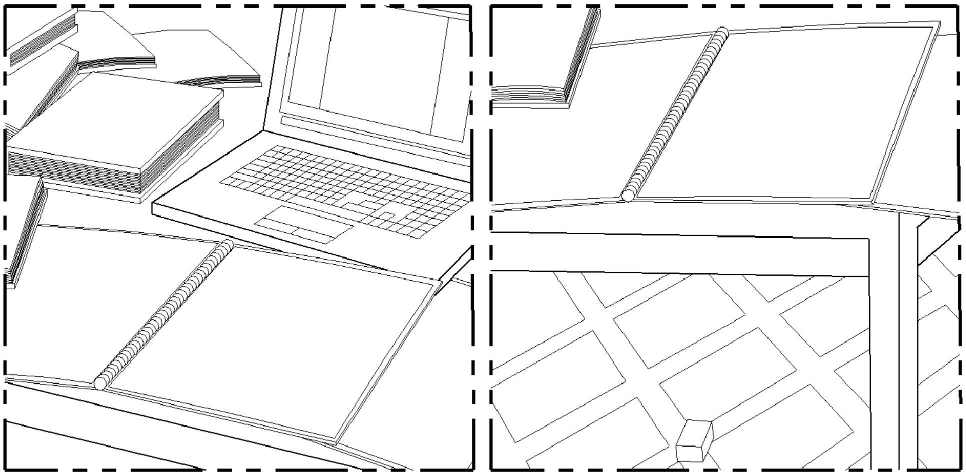
FIG. 3A, FIG. 3B, and FIG. 3C are views illustrating images by stages of an image stitching method using image masking according to the present invention.
Figure 3B:
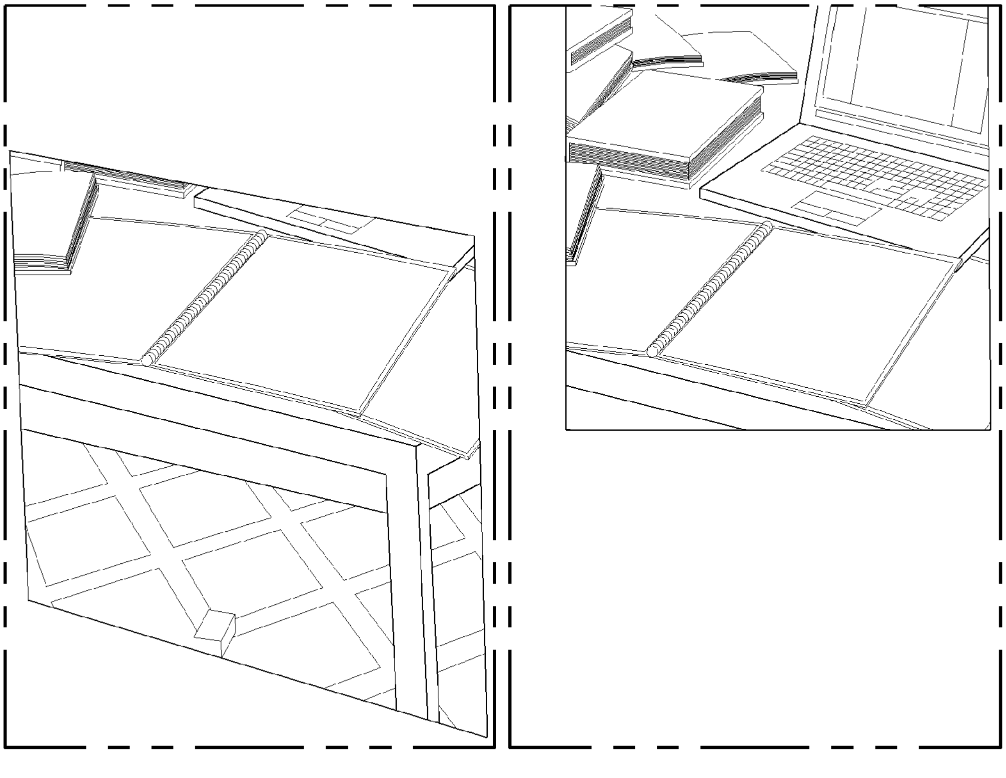
Figure 3C:
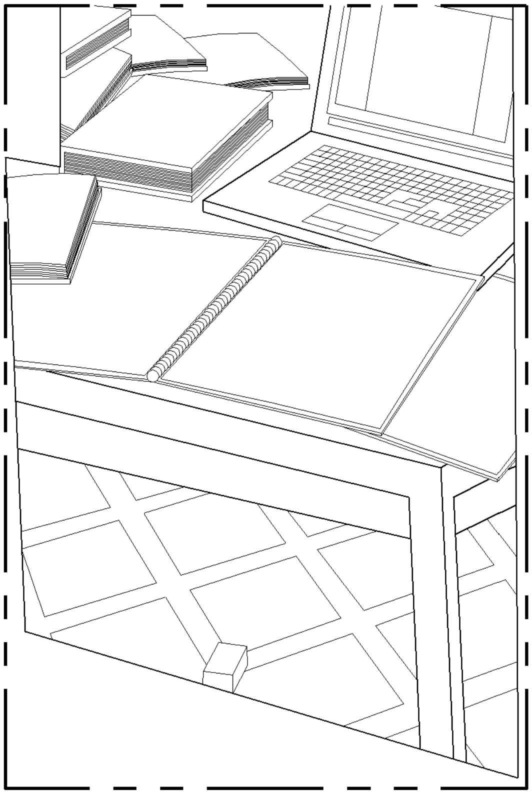

FIGS. 3A to 3C illustrate images by stages suggested to supplement the description of the image stitching method using image masking described above. FIG. 3A shows original images to be stitched, FIG. 3B shows images transformed from the original images before being stitched by the stitching processing unit 60, and FIG. 3C shows a single image obtained by stitching the two transformed images.

Hereinafter, various examples to which the basic structure of the present invention described above is applicable will be described through embodiments.

Embodiment: Calculation of Overlapping Area Using GPS Information—FIGS. 4 and 5

Figure 4:
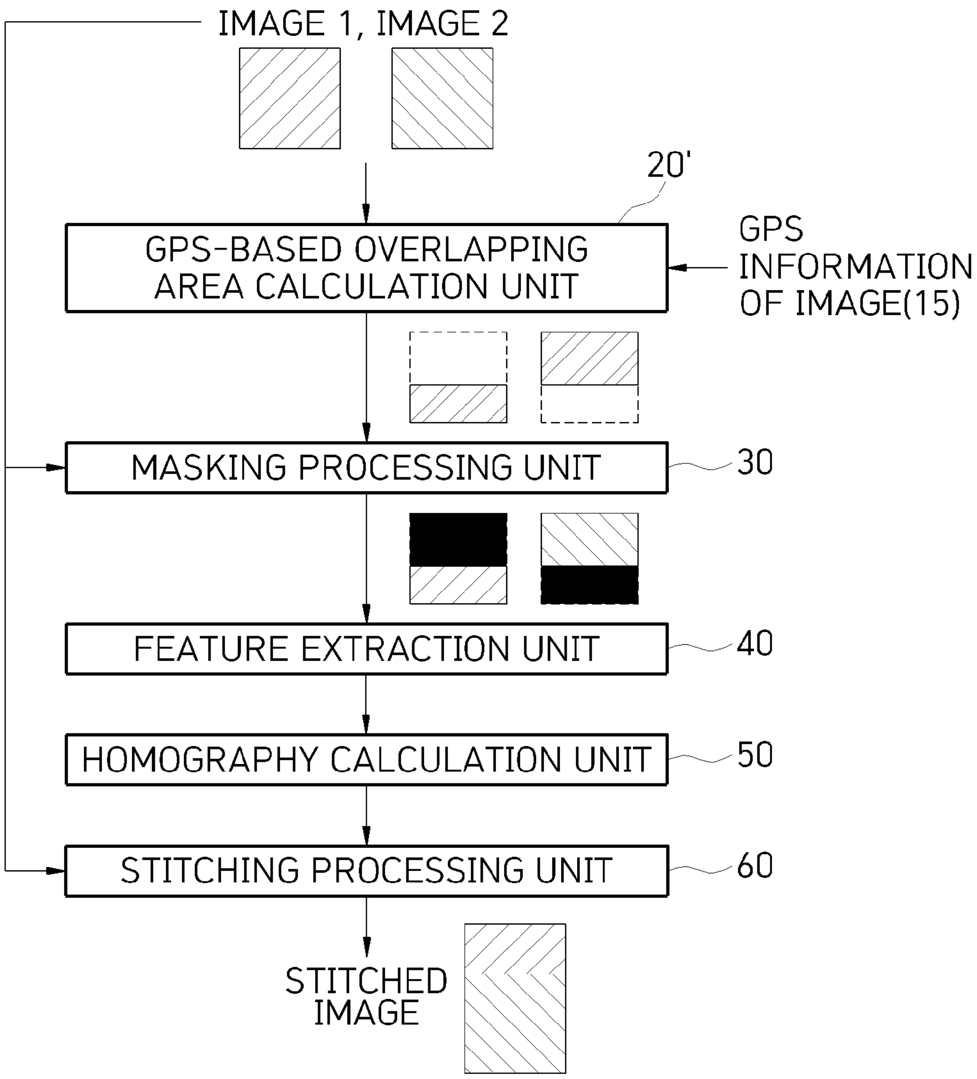
FIG. 4 is a view for describing an embodiment in which an image overlapping area is calculated using GPS information.

FIG. 4 is a view illustrating an embodiment in which a GPS-based overlapping area calculation unit 20' using GPS information is utilized to calculate an overlapping area.

Cases in which image stitching is required may include a case in which a flying object, such as a drone or an aircraft, moves and takes a picture with a GPS device mounted thereon. For example, images of the ground taken by a flying object, such as a drone or aircraft, moving in various directions at the same altitude may need to be stitched (e.g., stitching images taken by a flying object, such as a drone or aircraft, during vertical flight).

In this case, as shown in FIG. 4, the GPS-based overlapping area calculation unit 20' may use GPS information 15 of the image when calculating an image overlapping area. The utilization of GPS information is as follows. For example, in the case of photographing while moving at the same altitude, the latitude and longitude information of the GPS that may be obtainable when capturing the image may be utilized. Assuming that the distance between photographing equipment and a subject to be photographed and the photographing range of a camera lens are known, the absolute range of a latitude and a longitude on the Earth's surface may be calculated for each photographed image, and the overlapping portion may be calculated based on the absolute range of the latitude and the longitude. For example, in the case of photographing while moving vertically at the same latitude and longitude, altitude information that may be obtainable when capturing the image may be utilized. Assuming that the distance between photographing equipment and a subject to be photographed and the photographing range of a camera lens are known, the relative range of a subject included in each captured image may be calculated, and the overlapping portion may be calculated based on the relative range of the subject.

Figure 5:
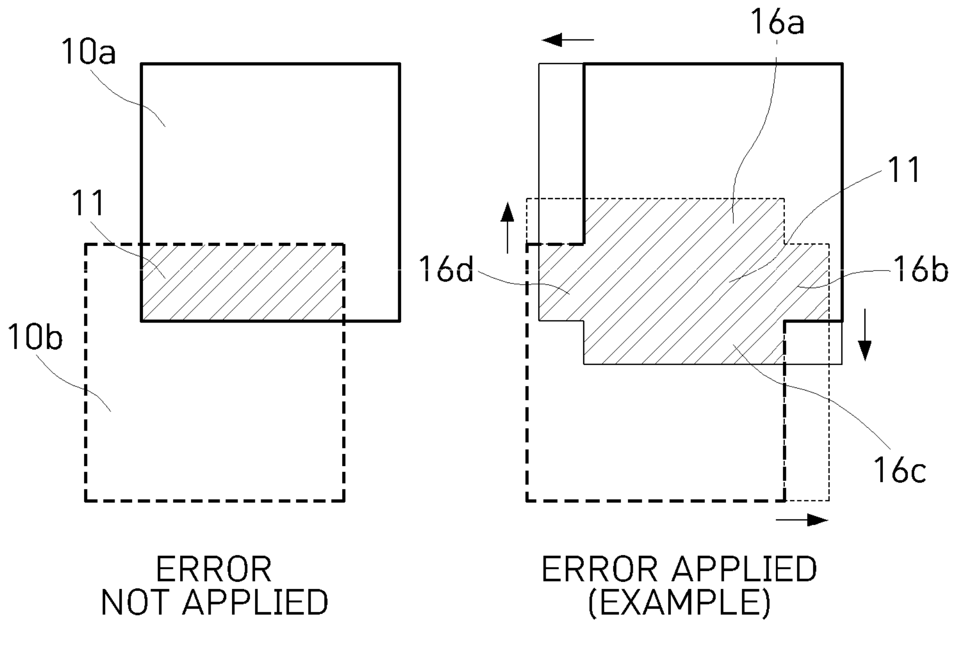
FIG. 5 is an exemplary view illustrating a method of determining an image overlapping area when using GPS information.

FIG. 5 is an exemplary view illustrating a method of calculating an image overlapping area by the overlapping area calculation unit 20' based on the image GPS information 15.

When calculating an image overlapping area based on the GPS, an image overlapping area 11 may be calculated without considering a GPS error as shown on the left in FIG. 5. In this case, additional areas 13*a* and 13*b* (as in the case of FIG. 2B described above) may be added to the overlapping areas 11*a* and 11*b*.

In addition, when calculating an image overlapping area based on the GPS, an image overlapping area 11 may be calculated to include all or some error areas 16*a*, 16*b*, 16*c*, and 16*d* in consideration of a GPS error, as in the case on the right in FIG. 5. The case illustrated on the right in FIG. 5 is a case in which the GPS error is applied only in the up, down, left, and right directions (see the four arrows), and as needed, the image overlapping area may be calculated to apply the error in various forms.

Embodiment: Utilization of Feature-Based Image Overlapping Area Calculation Tool—FIG. 6

Figure 6:
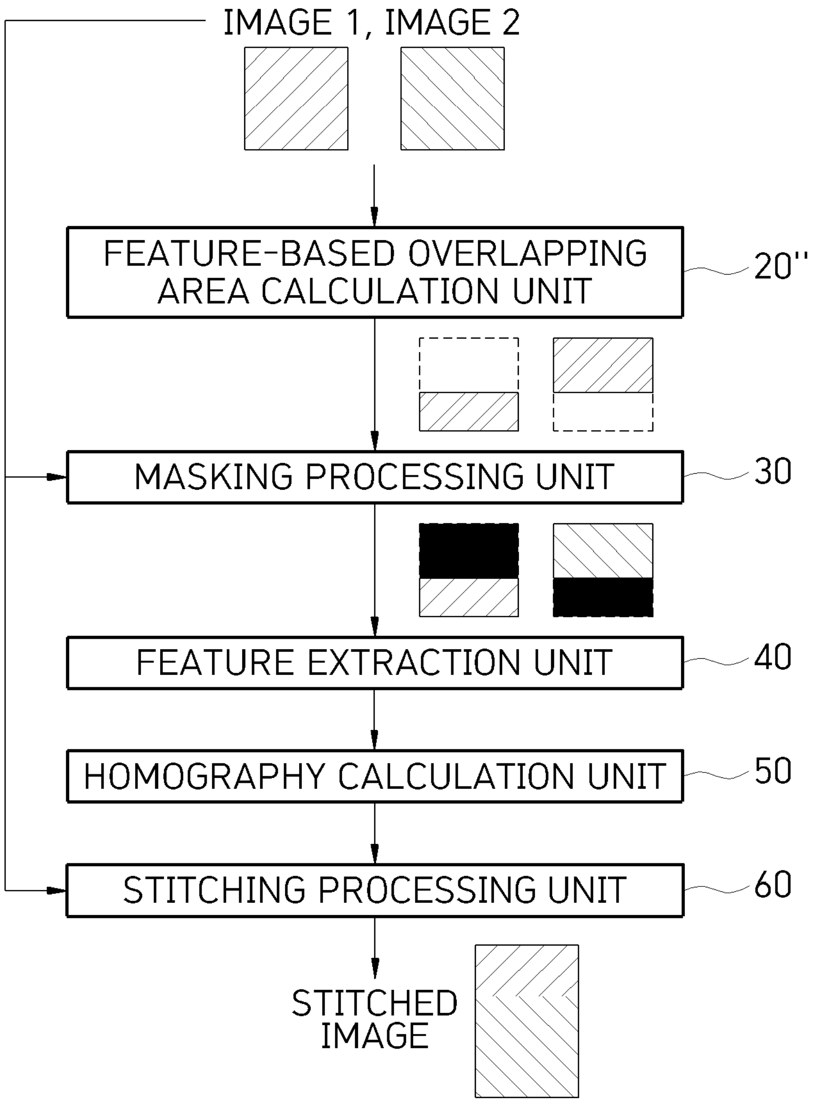
FIG. 6 is a view for describing an embodiment in which an image overlapping area is calculated based on features.

FIG. 6 illustrates an embodiment in which a feature-based image overlapping area calculation tool is utilized when calculating an overlapping area. This is an embodiment in which a feature-based overlapping area calculation tool specialized in image overlapping area calculation is used for calculating an overlapping area. For example, features are extracted from original images using feature extraction methods, such as an SIFT, SURF, an ORB, and the like, and an area in which features found in common between the images are distributed is calculated as an overlapping area.

In the embodiment, a feature-based overlapping area calculation unit 20" may derive an image overlapping area only with respect to images to be stitched without additional information. In this case, the calculated areas 11*a* and 11*b* may be used as an overlapping area as in the case of FIG. 2A described above. Alternatively, the surrounding areas 13*a* and 13*b* of the calculated area 11*a* and 11*b* may also be included and regarded as an overlapping area as in the case of FIG. 2B described above.

In addition, as described above, various feature extraction methods may be used to calculate the image overlapping area. That is, features may be extracted through methods such as an SIFT, SURF, an ORB, and the like, and an area in which features found in common between the images are distributed may be regarded as an overlapping area. Even in this case, only the calculated areas 11*a* and 11*b* may be used as an overlapping area as in the case of FIG. 2A described above, or the surrounding areas 13*a* and 13*b* of the calculated overlapping areas may also be included and regarded as an overlapping area as in the case of FIG. 2B.

In addition, the image overlapping area may be calculated through an artificial neural network, such as a CNN. In this case, the input of the artificial neural network may be images to be stitched, and the output of the artificial neural network may be an overlapping area. Even in this case, only the calculated areas may be used as an overlapping area as in the case of FIG. 2A described above, or the surrounding areas of the calculated overlapping areas may be included and regarded as an overlapping area as in the case of FIG. 2B.

Embodiment: Utilization of Plurality of Overlapping Area Calculation Tools—FIG. 7

Figure 7:
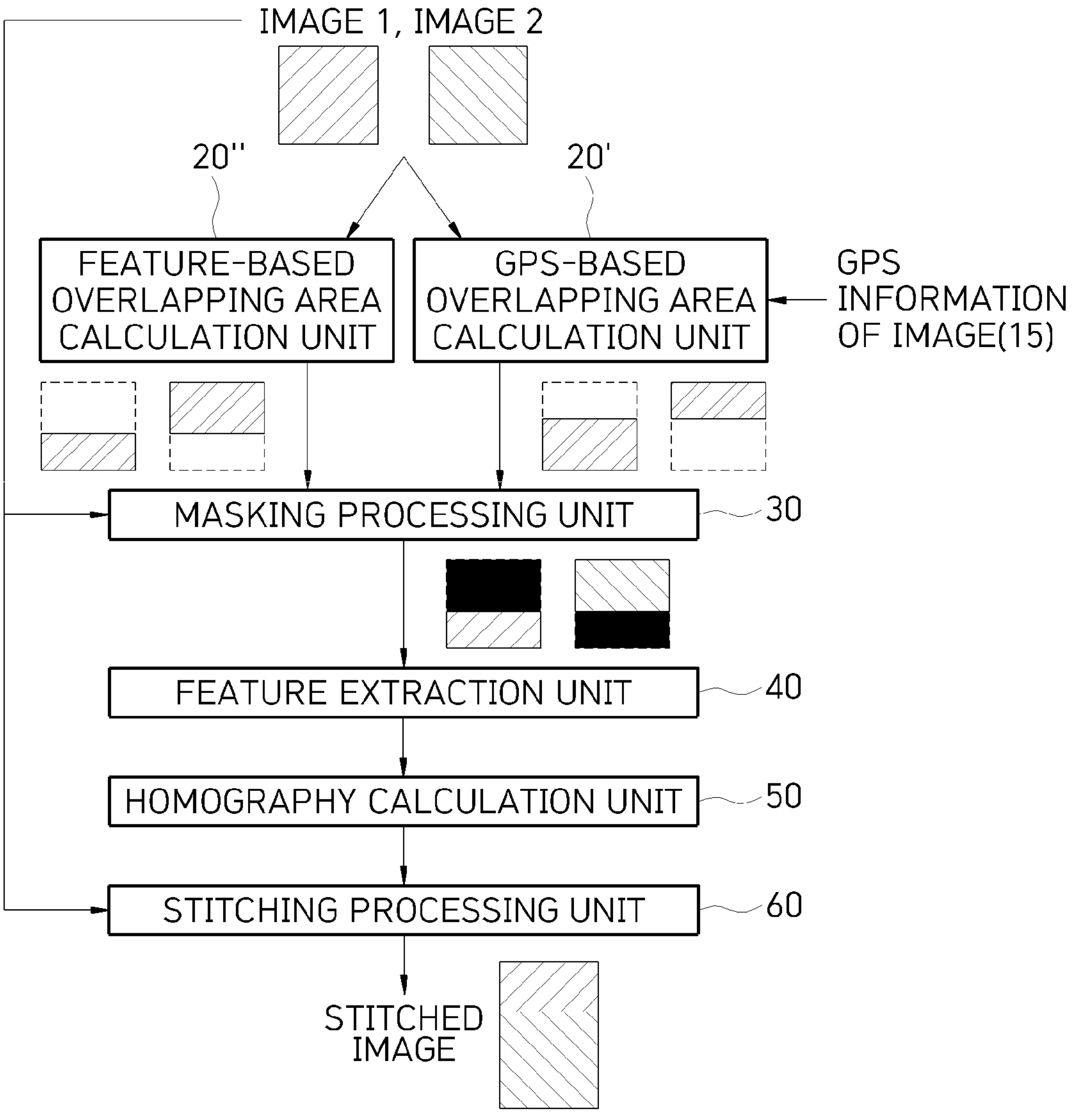
FIG. 7 is a view for describing an embodiment in which a plurality of overlapping area calculation methods are utilized.

FIG. 7 illustrates an embodiment in which overlapping area calculation is executed using a plurality of overlapping area calculation tools, for example, the GPS-based overlapping area calculation tool 20' and the feature-based overlapping area calculation tool 20". Although two image overlapping area calculation tools are illustrated in FIG. 7, more than two calculation tools may be used. Hereinafter, the overlapping area calculation units 20' and 20" and the masking processing unit 30 will be described in detail. The remaining procedures may be performed in the same manner as that described above with reference to FIG. 1.

The overlapping areas of the images to be stitched may be calculated using the image overlapping area calculation tool 20' based on the additional GPS information 15 as described through FIGS. 4 and 5 and the image overlapping area calculation tool 20" based on features as described through FIG. 6.

Figure 8:
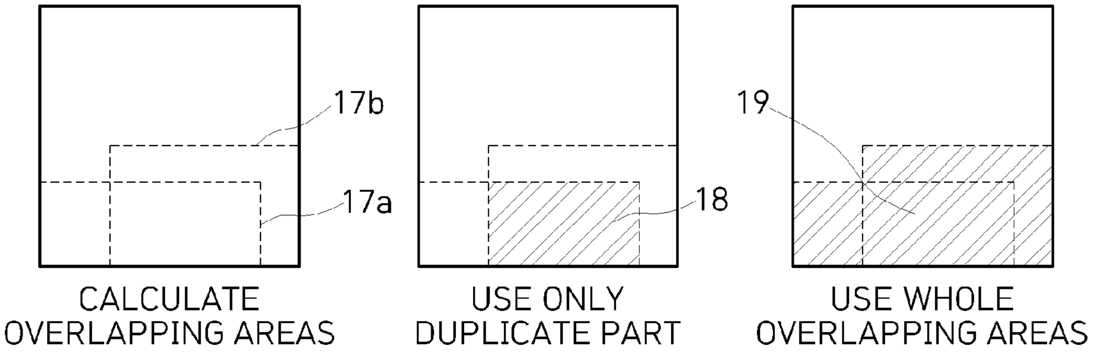
FIG. 8 is an exemplary view illustrating a method of utilizing a plurality of image overlapping area calculation results.

The masking processing unit 30 may utilize the results of the plurality of image overlapping area calculation tools 20' and 20" together. FIG. 8 illustrates an example of calculating a final overlapping area using the results derived by the plurality of image overlapping area calculation tools according to the present embodiment.

The left side of FIG. 8 shows overlapping areas 17*a* and 17*b* (dotted line quadrangles) calculated by the two image overlapping area calculation tools. In addition, when an image overlapping area for image masking is finally determined, only an area 18, in which the resultant overlapping areas 17*a* and 17*b* by the image overlapping area calculation tools are duplicate each other, may be utilized as shown in the center of FIG. 8. Alternatively, as shown on the right in FIG. 8, a composite area 19 including the whole overlapping areas by the image overlapping area calculation tools may be utilized.

Even in this case, the result of calculating the image overlapping area may be used without change as in the case described above with reference to FIG. 2A, or alternatively, the result of calculating the image overlapping area may be modified and used as in the case described above with reference to FIG. 2B.

Foundational Technology

Figure 9:
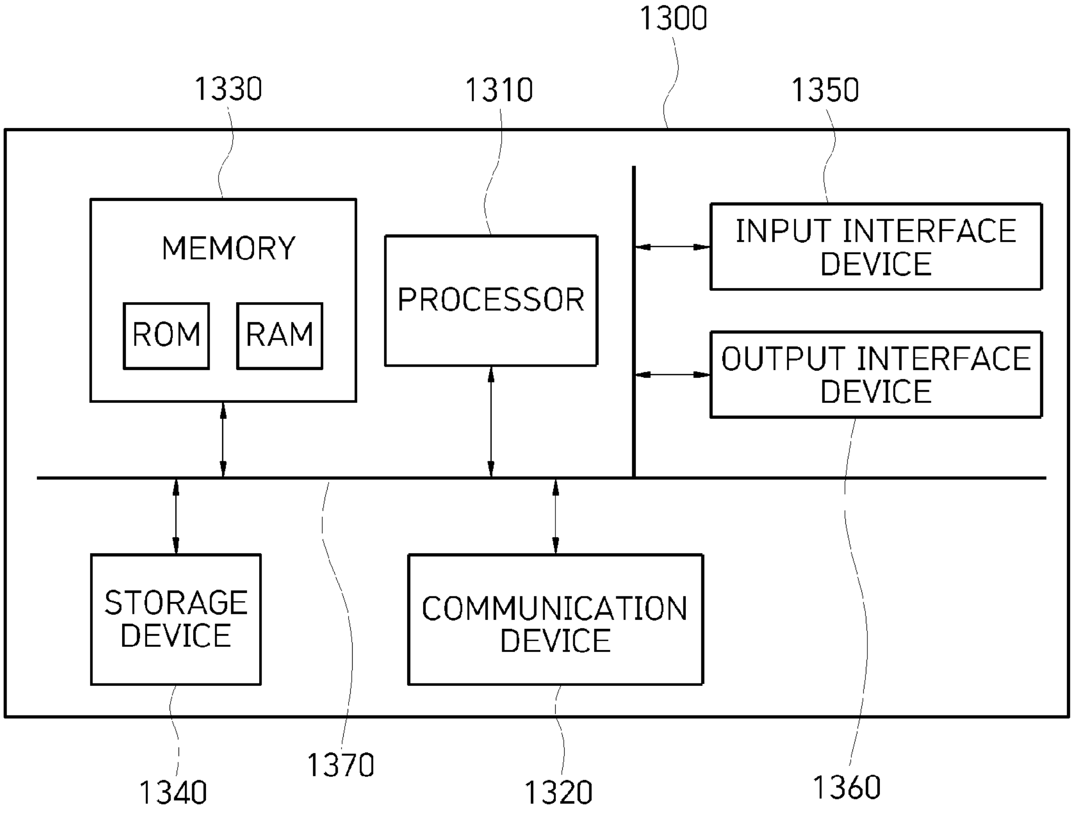
FIG. 9 is a block diagram illustrating a computer system for implementing the present invention.

FIG. 9 is a block diagram illustrating a computer system for implementing the present invention.

A computer system 1300 shown in FIG. 9 may include at least one of a processor 1310, a memory 1330, an input interface device 1350, an output interface device 1360, and a storage device 1340 that communicate through a bus 1370. The computer system 1300 may further include a communication device 1320 coupled to a network. The processor 1310 may be a central processing unit (CPU) or a semiconductor device for executing instructions stored in the memory 1330 and/or storage device 1340. The communication device 1320 may transmit or receive a wired signal or a wireless signal. The memory 1330 and the storage device 1340 may include various forms of volatile or nonvolatile media. For example, the memory 1330 may include a read only memory (ROM) or a random-access memory (RAM). The memory 1330 may be located inside or outside the processor 1310 and may be connected to the processor 1310 through various known means. The memory 1330 may include various forms of volatile or nonvolatile media, for example, may include a ROM or a RAM.

Accordingly, the present invention may be embodied as a method implemented by a computer or as a non-transitory computer readable medium in which computer executable instructions are stored. According to an embodiment, when executed by a processor, a method according to at least one aspect of the present disclosure may be performed according to computer readable instructions.

In addition, the method according to the present invention may be implemented in the form of program instructions executable by various computer devices and may be recorded on computer readable media. The computer readable media may be provided with program instructions, data files, data structures, and the like alone or as a combination thereof. The program instructions stored in the computer readable media may be specially designed and constructed for the purposes of the present invention or may be well known and available to those having skill in the art of computer software. The computer readable storage media include hardware devices configured to store and execute program instructions. For example, the computer readable storage media include magnetic media such as hard disks, floppy disks, and magnetic tape, optical media such as a compact disc (CD)-ROM and a digital video disk (DVD), magneto-optical media such as floptical disks, a ROM, a RAM, a flash memory, etc. The program instructions include not only machine language code made by a compiler but also high level code that can be used by an interpreter etc., which is executed by a computer.

According to the present invention, an area on which feature extraction required for image stitching needs to be performed can be reduced, thereby improving the computational efficiency of image stitching. In addition, since areas that are unrequired when extracting features serving as criteria for image stitching are excluded, calculation errors that can occur during feature matching can be reduced, thereby improving the performance of image stitching.

The present invention is implemented to apply the conventionally proposed image stitching methods by only performing image masking selectively according to the procedures so that the conventionally proposed image stitching methods can be applied without significant change, and thus expanded in the range of utilization.

While embodiments of the present invention have been described in detail, it should be understood that the technical scope of the present invention is not limited to the embodiments and drawings described above, and is determined by a rational interpretation of the scope of the claims.

What is claimed is:

1. An image stitching method having computational operations for image stitching processed by a processor included in a computer, the computational operations comprising:

calculating overlapping areas of a plurality of original images using a plurality of image overlapping area calculation tools that include a Global Positioning System (GPS)-based overlapping area calculation tool and a feature-based overlapping area calculation tool;

masking areas of the original images in which the original images do not overlap each other, using the calculated overlapping areas to provide masked images;

extracting features from the masked images;

calculating a homography for transformation of the original images, using the extracted features;

transforming the original images, using the calculated homography; and stitching the transformed original images to output a stitched image.

2. The image stitching method of claim 1, wherein the calculating of the overlapping areas comprises calculating presence or absence of an overlap in units of pixels with respect to each of the original images.

3. The image stitching method of claim 1, wherein the calculating of the overlapping areas comprises calculating presence or absence of an overlap in units of super-pixels with respect to each of the original images.

4. The image stitching method of claim 1, wherein the calculating of the overlapping areas comprises, in the case of no information about an error in the calculating of the overlapping areas with respect to the original images, outputting a result of calculating the overlapping areas without change.

5. The image stitching method of claim 1, wherein the calculating of the overlapping areas comprises, in the case of no information about an error in the calculating of the overlapping areas with respect to the original images, determining the overlapping areas by including or removing additional marginal areas in or from first calculated overlapping areas.

6. The image stitching method of claim 1, wherein the calculating of the overlapping areas comprises, in response to receiving information about an error in the calculating of the overlapping areas with respect to the original images, correcting the overlapping areas considering the error.

7. The image stitching method of claim 1, wherein the calculating of the overlapping areas comprises, in response to receiving information about an error in the calculating of the overlapping areas with respect to the original images, determining the overlapping areas by including or removing the error and additional marginal areas in or from first calculated overlapping areas.

8. The image stitching method of claim 1, wherein the masking comprises masking areas other than the overlapping areas calculated with respect to the original images.

9. The image stitching method of claim 1, wherein the masking comprises masking areas other than the overlapping areas calculated with respect to the original images and surrounding areas of the overlapping areas.

10. The image stitching method of claim 1, wherein the GPS-based overlapping area calculation tool utilizes GPS information of the original images to calculate the overlapping areas.

11. The image stitching method of claim 10, wherein, in calculating the overlapping areas using the GPS information, the overlapping areas are calculated without considering a GPS error.

12. The image stitching method of claim 10, wherein, in calculating the overlapping areas using the GPS information, the overlapping areas are calculated by considering a GPS error.

13. The image stitching method of claim 1, wherein the feature-based overlapping area calculation tool utilizes features extracted from the original images and areas in which features found in common between the original images are distributed to calculate the overlapping areas.

14. The image stitching method of claim 1, wherein the calculating of the overlapping areas comprises calculating the overlapping areas using an artificial neural network.

15. The image stitching method of claim 1, wherein the calculating of the overlapping areas comprises calculating areas in which overlapping areas calculated by the plurality of image overlapping area calculation tools overlap each other as final overlapping areas.

16. The image stitching method of claim 1, wherein the calculating of the overlapping areas comprises calculating areas including overlapping areas calculated by the plurality of image overlapping area calculation tools as final overlapping areas.

17. An image stitching apparatus comprising:

an overlapping area calculation unit configured to calculate overlapping areas of a plurality of original images using a plurality of image overlapping area calculation tools that include a Global Positioning System (GPS)-based overlapping area calculation tool and a feature-based overlapping area calculation tool;

a masking processing unit configured to mask areas of the original images in which the plurality of original images do not overlap each other using the calculated overlapping areas to provide masked images;

a feature extraction unit configured to extract features from the masked images;

a homography calculation unit configured to calculate a homography for transformation of the original images using the extracted features; and a stitching processing unit configured to transform the original images using the calculated homography and stitch the transformed original images to output a stitched image.

18. The image stitching apparatus of claim 17, wherein the GPS-based overlapping area calculation tool utilizes GPS information to calculate the overlapping areas of the original images.

19. The image stitching apparatus of claim 17, wherein the feature-based overlapping area calculation tool utilizes features extracted from the original images and areas in which features found in common between the original images are distributed to calculate the overlapping areas.

* * * * *